United States Patent [19]

Cozine et al.

[11] Patent Number: 4,867,244
[45] Date of Patent: Sep. 19, 1989

[54] TURF AERATING APPARATUS

[75] Inventors: Mark L. Cozine; David G. Ferguson; Loren F. Hansen; Mark E. Lamb, all of Lincoln, Nebr.

[73] Assignee: Outboard Marine Corporation, Waukegan, Ill.

[21] Appl. No.: 120,948

[22] Filed: Nov. 16, 1987

[51] Int. Cl.$^4$ ............................................. A01B 45/02
[52] U.S. Cl. ........................................... 172/22; 172/97
[58] Field of Search ................ 172/21, 22, 95, 42, 172/43, 75, 82, 84, 88, 93, 100, 101, 97, 99, 92, 44; 111/7, 89

[56] References Cited

U.S. PATENT DOCUMENTS

| | | | |
|---|---|---|---|
| 1,469,751 | 10/1923 | Chase et al. | |
| 2,223,559 | 12/1940 | Fleming | 172/84 X |
| 2,347,748 | 5/1944 | Melling | 172/21 |
| 2,622,498 | 12/1952 | Wharton | 172/43 |
| 2,629,364 | 2/1953 | Anderson | |
| 2,638,831 | 5/1953 | Ferguson | 172/22 |
| 2,728,283 | 12/1955 | Oswalt | 172/21 |
| 2,800,066 | 7/1957 | Cohrs | 172/22 |
| 3,022,834 | 2/1962 | Ruka | 172/21 |
| 3,429,378 | 2/1969 | Mascaro | 172/22 |
| 3,581,832 | 6/1971 | Heermann | 173/162 |
| 3,637,029 | 1/1972 | Sherwood et al. | 173/162 |
| 3,728,793 | 4/1973 | Makinson et al. | 173/162 |
| 3,824,417 | 7/1974 | Moores, Jr. | 173/117 |
| 4,606,412 | 8/1986 | Classen | 172/22 |
| 4,629,359 | 12/1986 | Sengupta | 404/112 |
| 4,658,909 | 4/1987 | McDermott | 172/22 |
| 4,750,565 | 6/1988 | Hansen | 172/22 |

FOREIGN PATENT DOCUMENTS

| | | | |
|---|---|---|---|
| 512817 | 10/1920 | France. | |
| 4949 | of 1905 | United Kingdom | 172/21 |
| 617726 | 4/1949 | United Kingdom. | |

*Primary Examiner*—Richard J. Johnson
*Attorney, Agent, or Firm*—John T. Synnestvedt; Richard D. Weber

[57] ABSTRACT

A walk-behind turf aerating apparatus includes two pairs of tine arm assemblies, each assembly having a pair of vertically reciprocating tine arms for driving coring tines into the turf. A tine arm return mechanism includes a gear box for each pair of tine arms, the lower ends of the tine arms being connected to cranks extending from the gear box to reposition the tine arms prior to ground engagement. Stops are provided to limit the tine arm travel. A spring-loaded lifting mechanism permits manual shifting of the tine arm mechanism from a lowered ground-engaging position to a raised transport position. A belt drive with clutch and reduction drive for the wheels also drives the tine arm mechanism with automatic disengagement when the wheels are in the transport position. A handle assembly is connected to the apparatus frame through a pivotal connection including vibration damping elements for minimizing transmittal of vibrations, particularly in the vertical plane, to the handle.

12 Claims, 6 Drawing Sheets

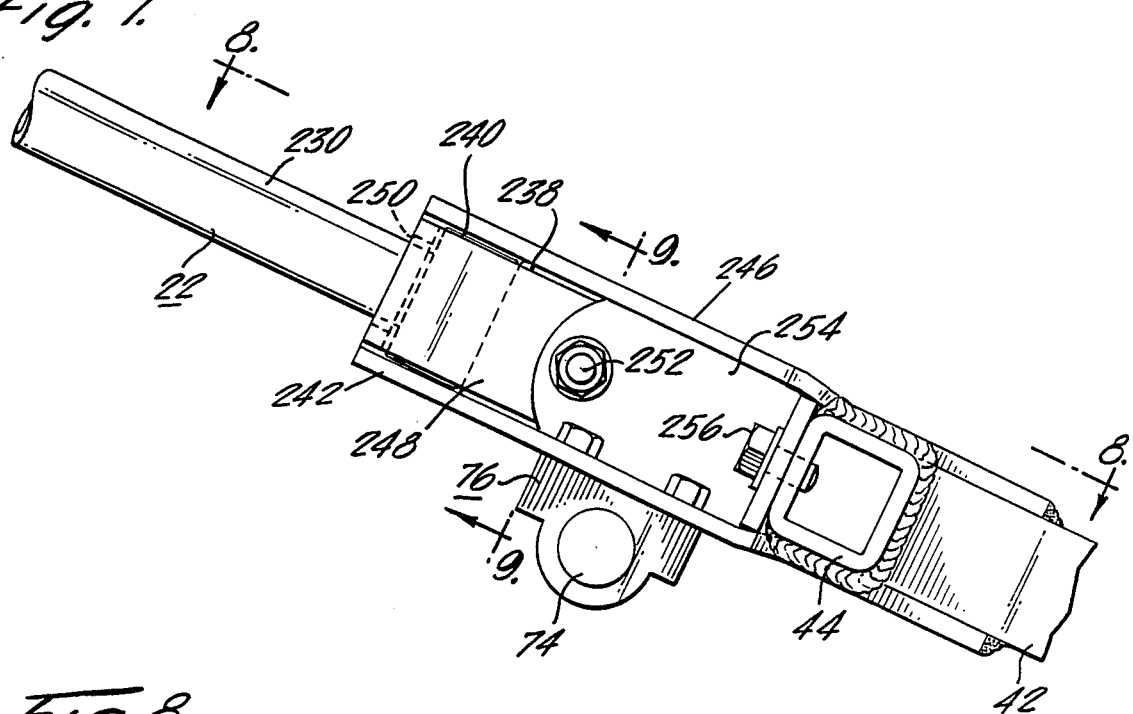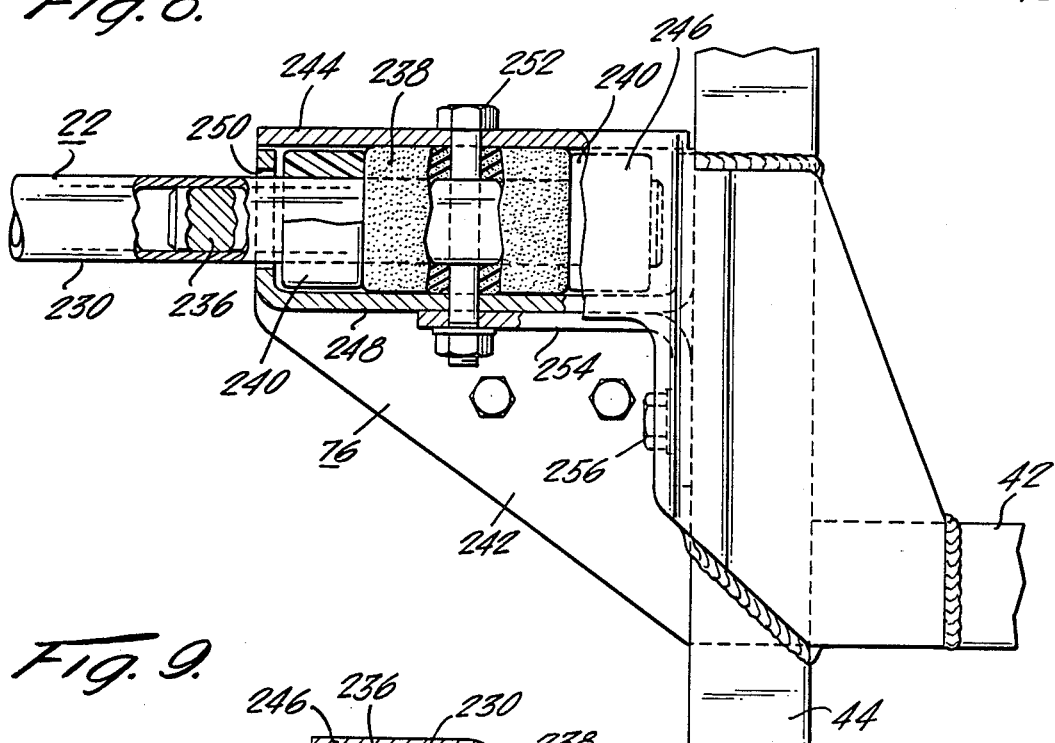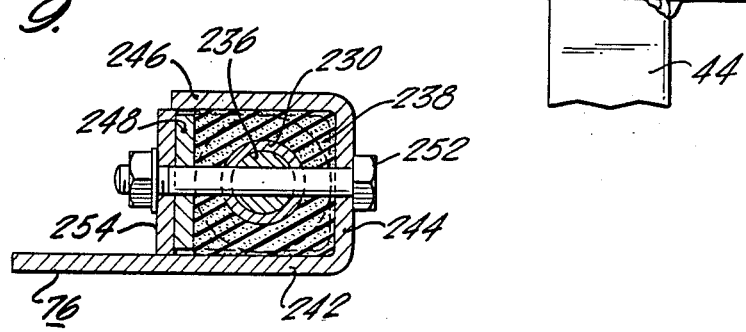

TURF AERATING APPARATUS

BACKGROUND OF THE INVENTION

The present invention relates generally to lawn maintenance equipment and relates more particularly to an apparatus for aerating turf by sequentially driving sets of coring tines into the ground to remove substantially cylindrical turf cores with a minimal disturbance of the surrounding turf area.

The importance of aerating lawns to permit water, oxygen and nutrients to reach the grass root region has been recognized for some time by experts in lawn care, particularly those involved in maintaining functional lawn areas such as golf courses, athletic fields, etc. A variety of types of equipment have been devised for aerating turf, some of which simply cut slits in the earth, while others either displace or remove small turf portions at spaced intervals.

Turf aerating equipment can basically be divided into two broad types, the simplest of which is the rotary type which typically involves a roller or rotatably mounted elements equipped with soil penetrating elements, which usually comprise disc-like knives, spoon tines or hollow coring tines. Although the knife-equipped roller type aerator provides a fairly clean slicing action of the turf, a rotary type device using fixed spoon tines or coring tines tends to disturb and tear up the area immediately surrounding the tine holes and thus is not suitable for critical lawn surfaces such as golf course greens.

A second and more complex type of aerating equipment is the reciprocating type which employs hollow coring tines which are driven substantially vertically into the ground in a reciprocating fashion. Such devices not only cause less damage to the surrounding lawn surface, but in addition, are usually capable of achieving a deeper penetration of the soil than rotary type aerators. The present invention is directed to such a reciprocating type aerating device.

Since it would be impractical to stop the forward motion of the machine each time a set of tines is driven into the ground, reciprocating aerators must include a mechanism for accommodating the necessary relative horizontal movement of the tines and the aerator frame during turf penetration and for repositioning the tines preparatory to their next downward stroke. In an early form of aerating device, the lower ends of the vertically reciprocated tine arms were spring loaded toward a stop plate at their lower ends such that engagement with the ground would extend the tension springs as the machine moved away from the ground engaging tines. Upon emergence of the tines from the ground, the springs would return the tine arms to a position against the stop ready for the next ground engagement. Although such a device provided the requisite relative movement between the tines and the machine frame, the sliding of the tine arms along guides and the impacting of the arms against the stop resulted in considerable friction, wear and a noisy operation of the device.

Later devices employed mechanisms for positively controlling the lower ends of the tine arms, such mechanisms being interconnected with the forward drive mechanisms of the machine to prevent tearing of the turf by the engaged tines. In one popular device of this type, the vertically reciprocating tine arms are carried by slides which are oscillated horizontally by a rotating cam. While the cam and slide arrangement provides a reasonably good tine motion, the mechanism is complex, expensive to manufacture and maintain, and requires a significant amount of power to drive the slides, tine arms and tines in translational movement.

In U.S Pat. No. 4,645,012, issued Feb. 24, 1987, and assigned with the present application to a common assignee, an improved tine arm return mechanism is disclosed wherein a pair of rocker arms are linked to a rocker shaft such that the engagement of the ground by one tine arm and its result ant rearward movement serves to advance the other tine arm forwardly to its proper position for starting its ground engaging stroke. This arrangement eliminates the need for a powered lower tine end positioning arrangement and permits changes in the forward speed of the apparatus to vary the hole spacing in contrast to prior art devices which drove the tine lower ends at a fixed spacing and accordingly required a coordinated machine drive rate. The present invention utilizes the general concept of the 4,645,012 patent with respect to the tine arm return mechanism but accomplishes the function with an improved mechanism.

In the above referenced patent, the apparatus was of the riding type and included a hydraulic system for operating the lift mechanism for raising the tines away from the ground for transport, as well as for driving the wheels for moving the apparatus across the turf. The present invention, directed to a walk-behind aerator, provides a novel belt drive transmission with a simple clutch mechanism for the drive wheels. The application further provides a manually actuated spring loaded arrangement for raising the tines to a transport position along with a tine drive clutch which is automatically disengaged in the transport position.

SUMMARY OF THE INVENTION

A turf aerating apparatus in accordance with the present invention includes two or more pairs of substantially vertical tine arms, each tine arm having a plurality of turf coring tines attached to the lower end thereof. A tine arm actuating mechanism comprises a pair of opposed cranks attached to the upper ends of each pair of tine arms to impart a ground penetrating movement to the tine arms. The lower ends of each pair of tine arms are linked by cranks to a gear box containing a pair of oppositely rotating gears such that the rearward motion of a ground engaging tine through action of the gear box produces a commensurate forward motion of the other tine arm of the pair. Stops are provided to limit the tine arm motion to prevent inertial forces from over-extending the tine arm lower end travel. The utilization of two or more pairs of tine arms with the tine arm return mechanism described provides a broad width of aerator action while permitting deviations from a straight line path of the mechanism to accommodate obstructions or nonlinear turf areas such as caused by a curving driveway or irregular garden plan.

The invention includes a novel belt drive system for powering both the tine arms as well as the drive wheels. A reduction gear box, which transfers power from the engine drive belt to the drive wheels, is movable away from the engine drive belt by a handlebar control which requires continuous operator gripping to provide forward motion of the apparatus.

A novel system is provided for lifting the tine arms out of a ground engaging position into a transport position. This system includes a spring loading of the main drive wheels to permit a manual shifting of the tine mechanism between the operating and transport positions from the operator station. Upon shifting the mechanism into the transport position, the drive belt to the tine arm drive mechanism is automatically disengaged.

The invention further includes a novel vibration dampening connection of the operating handle to the apparatus frame. This mounting arrangement includes pivotal attachment of the handle assembly to the frame with resilient vibration dampeners acting on the handle elements through a limited degree of rotational movement and stop elements limiting handle movement beyond this range.

It is accordingly a first object of the present invention to provide a walk-behind turf aerating apparatus of the reciprocating type for driving sets of hollow coring tines alternately into the turf with a minimal disturbance of the surrounding turf areas.

Another object of the invention is to provide a turf aerating apparatus as described having an improved arrangement for returning the lower tine arm ends and positioning the tine ends for ground engagement.

Another object of the invention is to provide a turf aerating apparatus as described which permits the operator to manually lower the main drive wheels to shift the tines into an elevated transport position.

A still further object of the invention is to provide an aerating mechanism as described having a novel belt drive transmission for transmitting power to both the tine arms and the main drive wheels.

Still another object of the invention is to provide a turf aerating apparatus as described having a handle mounting arrangement for minimizing the transfer of vibratory movements to the handle and the operator.

A still further object of the invention is to provide an aerating apparatus as described of a relatively simple, inexpensive construction which can be easily maintained and operated.

Additional objects and advantages of the invention will be more readily apparent from the following detailed description of the preferred embodiment thereof.

BRIEF DESCRIPTION OF THE DRAWINGS

FIG. 7 is an enlarged view taken along line 7—7 of FIG. 2 showing details of the handle end mounting assembly;

FIG. 8 is a view taken along line 8—8 of FIG. 7 with parts broken away and in section;

FIG. 9 is a sectional view taken along line 9—9 of FIG. 7;

DESCRIPTION OF THE PREFERRED EMBODIMENT

Figure 2:
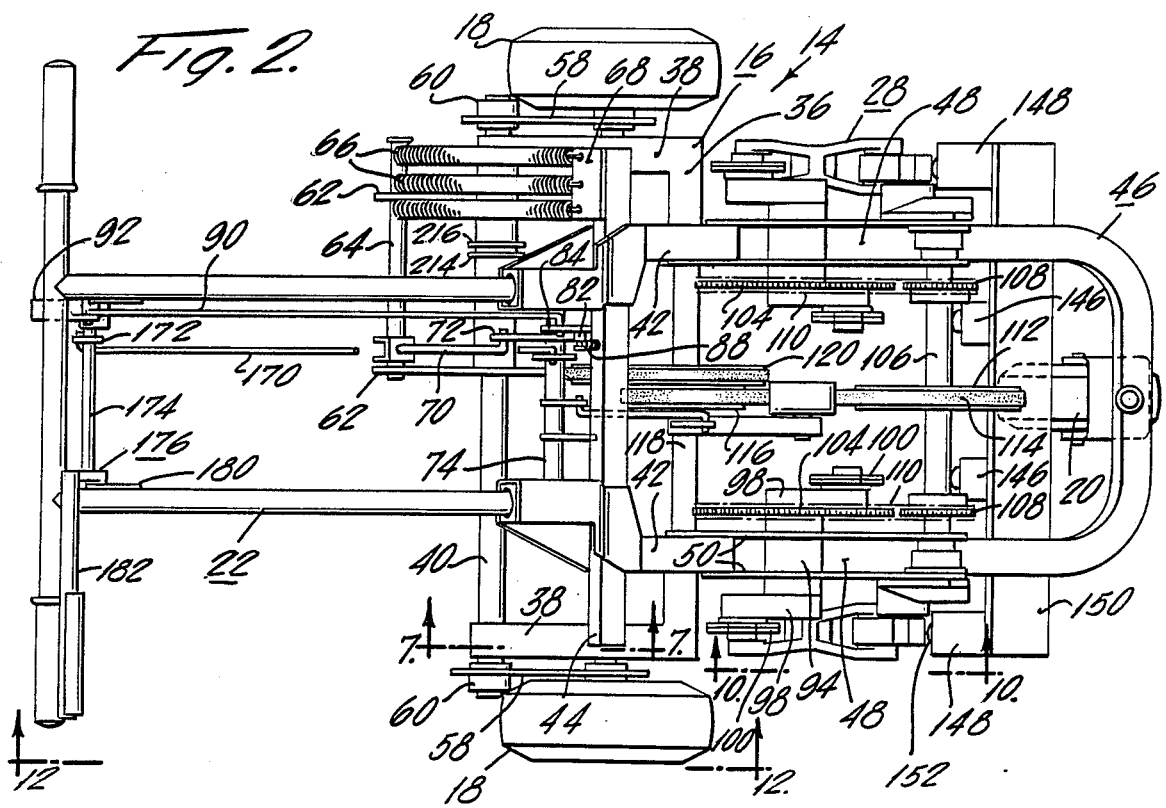
FIG. 2 is a top plan view of the apparatus shown in FIG. 1.
Figure 1:
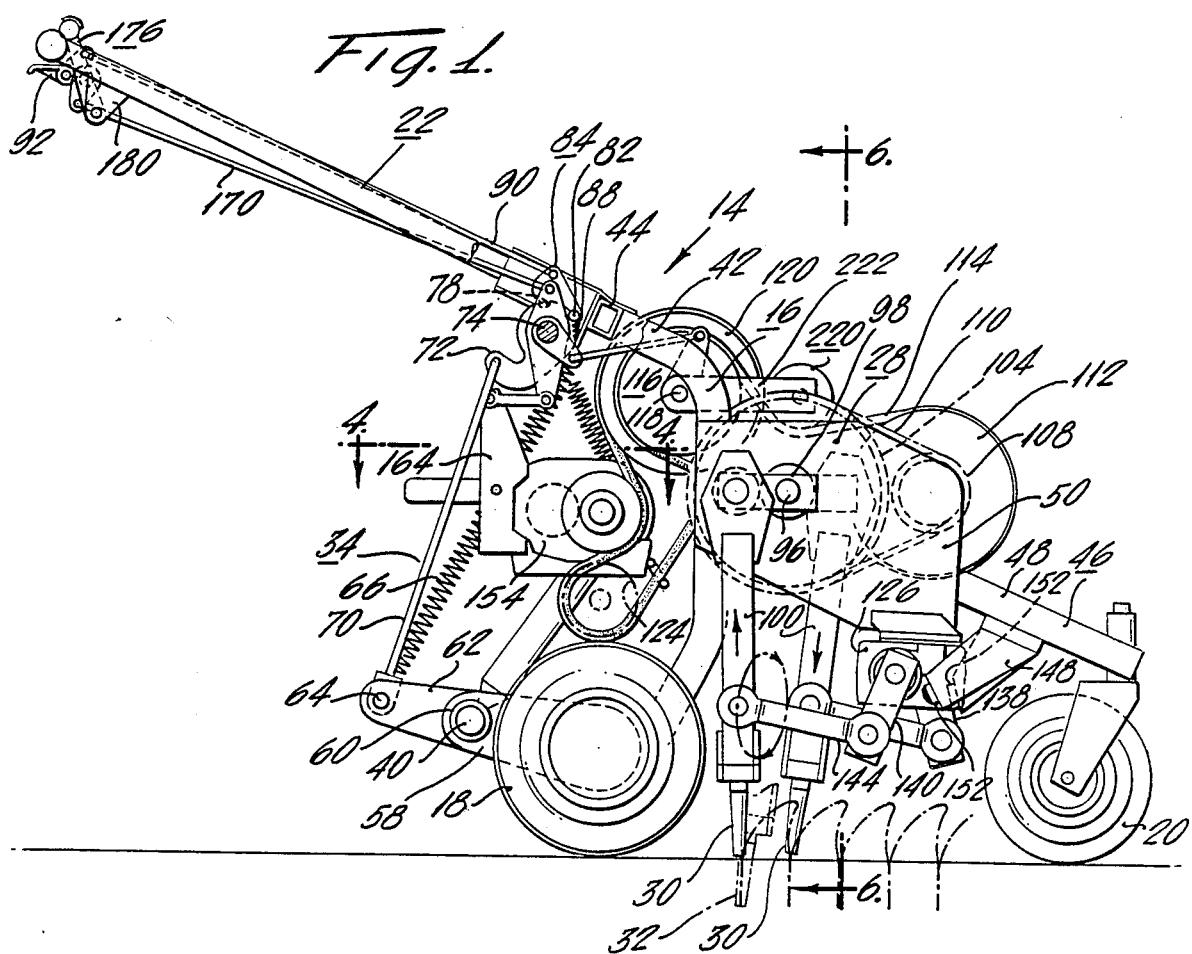
Fig. 1 is a right side elevational view of a turf aerating apparatus in accordance with the invention showing the tine arms in the lowered, ground engaging position.

Referring to the drawings and particularly FIGS. 1 and 2 thereof, a turf aerating apparatus generally designated 14 in accordance with the present invention includes a frame assembly 16 which is supported for rolling movement across a turf area by a pair of rubber tired rear drive wheels 18 and single rubber tired front caster wheel 20. A rearwardly extending handle assembly 22 permits control of the apparatus by a walking operator. The apparatus is powered by a gasoline engine 24 (shown only in FIG. 5), which through a transmission assembly 26 (omitted in FIG. 2) drives the rear wheels 18.

The engine 24 also drives an aerator mechanism generally designated 28 which functions to drive sets of hollow coring tines 30 into the turf in a reciprocating manner to form a repeating pattern of holes 32 in the turf by removing turf cores therefrom, the holes permitting the entrance of air, water and nutrients into the root areas of the turf.

Figure 3:
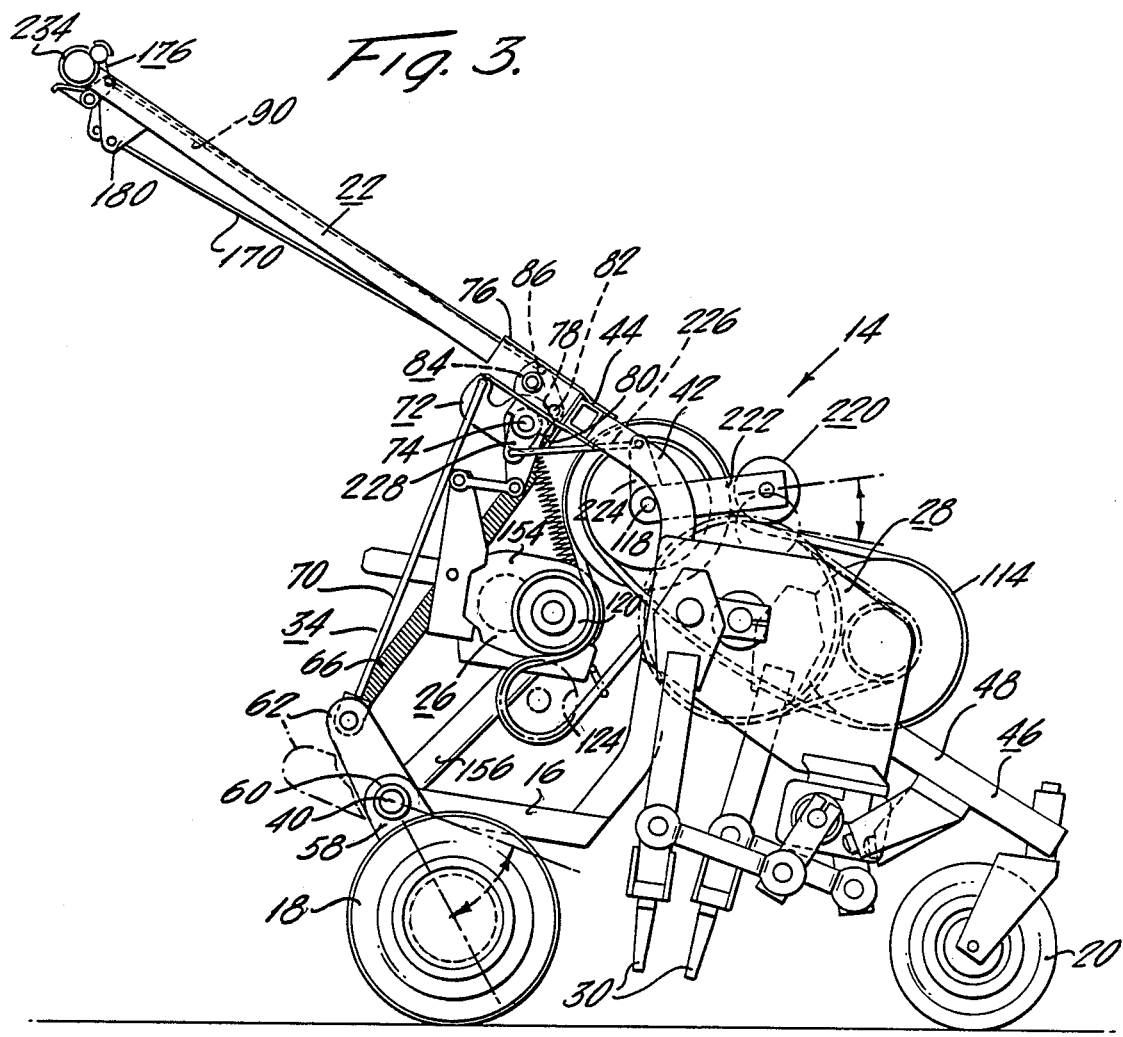
FIG. 3 is a view similar to Fig. 1 showing the apparatus in the raised transport position.

For transport of the apparatus, the aerator mechanism may be lifted to an elevated transport position as shown in FIG. 3 by means of a manually operated lifting mechanism generally designated 34. When shifted to the elevated transport position, the drive belt from the engine to the aerator mechanism is disengaged automatically for safety and to conserve energy and unnecessary wear of the mechanism.

With the above general summary of the apparatus in mind, the specific details of the invention will be considered.

Figure 5:
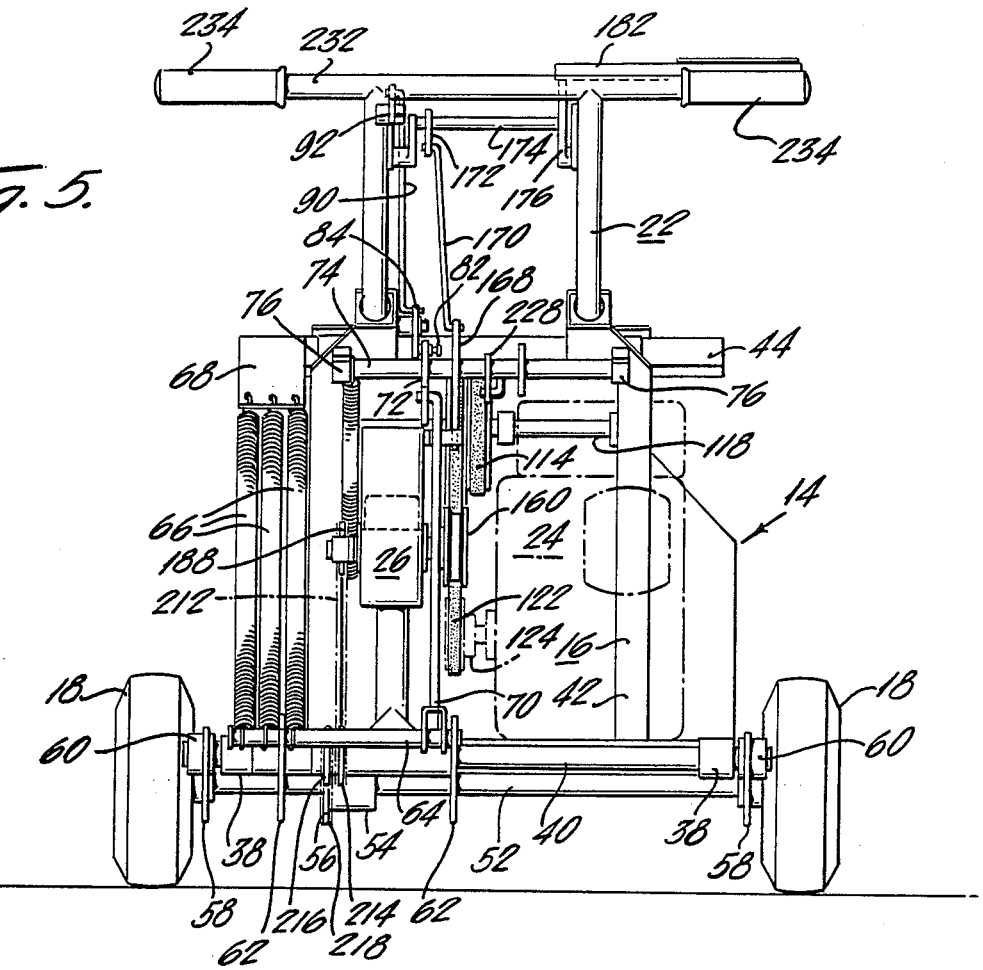
FIG. 5 is a rear view of the apparatus as shown in FIGS. 1 and 2.
Figure 6:
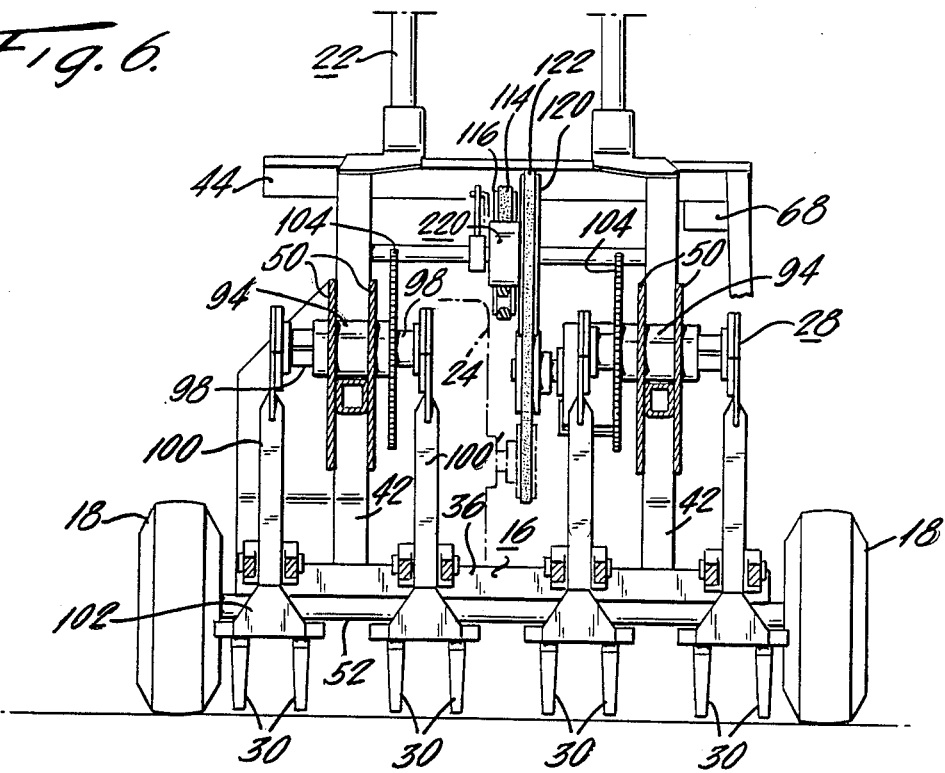
FIG. 6 is a view partly in section taken along line 6—6 of FIG. 1.

The frame assembly 16, which is somewhat complex and of an irregular shape, includes a C-shaped lower subassembly comprising a transverse element 36 and a pair of rearwardly extending outer frame elements 38 connected thereto. The rear ends of the elements 38 are joined by a transverse shaft 40 which serves a number of functions as later described. As shown in FIG. 5, the engine 24 is mounted on the frame subassembly comprising the elements 36 and 38.

Extending upwardly from the transverse frame element 36 are a pair of irregularly shaped upright frame elements 42 which are disposed somewhat inboard of the frame elements 38. The elements 42 at their upper ends are curved rearwardly and the ends thereof are joined by the transverse frame member 44 from which extends the handle assembly 22. The transverse frame member 44 extends outwardly beyond each of the frame elements 42. The frame assembly further includes a U-shaped forwardly extending downwardly inclined frame member 46 which includes parallel side legs 48 which are connected at their ends to the upright frame elements 42. Pairs of gusset plates 50 extending forwardly from the juncture of the frame elements 42 and 48 serve to strengthen the frame assembly and act as supports for the tine arm drive mechanism as described below.

The frame assembly elements described are welded or bolted to form a rigid unit. The assembly is supported for rolling movement across the ground by the rear drive wheels 18 and the caster wheel 20. As readily seen in FIGS. 1 and 2, the caster wheel 20 is pivotally mounted at the center of the frame element 46 and is freely pivotable through 360° to permit turning of the apparatus in any desired direction.

The drive wheels 18 are mounted on a drive axle 52 which incorporates a differential 54 driven through a differential chain sprocket 56. The axle 52 is connected near each end to an axle support arm 58, each of which in turn is pivotally mounted on the transverse shaft 40 by a bearing assembly 60. The axle and wheels may accordingly move through an arcuate path as indicated by the arrows of FIG. 3, and a mechanism is provided for facilitating the shifting of the wheels between the lowered transport position shown in FIG. 3 and the raised operating position of FIG. 1.

The mechanism for shifting the wheel position and locking the wheels in the desired position includes spring means for counteracting the weight of the apparatus carried by the wheels, and a locking assembly for locking the wheels in the raised or lowered position. Both the spring means and the locking means are operatively connected to the wheel and axle assembly by a pair of spaced lever arms 62 which are centrally pivoted on the frame shaft 40 and attached at their forward ends to the axle 52. The rear ends of the lever arms 62 extend rearwardly of the shaft 40 and support therebetween a transverse bar 64. A plurality of springs 66 extend from the bar 64 at their lower end to a spring attachment plate 68 at their upper end secured to the outwardly extending end of the transverse frame member 44. The springs 66, which are in tension, are selected to have a spring force sufficient to substantially counterbalance the weight of the machine carried by the rear drive wheels. thereby enabling the operator to raise or lower the wheel position with respect to the frame with only a modest application of force to the handle assembly 22.

The mechanism for locking the wheels in the raised or lowered position comprises a rod 70 pivotally extending between the bar 64 and a latch plate 72 rotatably mounted on a transverse shaft 74 which, as shown in FIG. 5 extends between handle support elements 76 disposed in spaced relation at the rear of the transverse frame element 44. The latch plate 72 at its opposite end from the connection with the rod 70 includes a pair of notches 78 and 80 into which a locking pin 82 of lock plate 84 is engaged to hold the latch plate 72 and hence the wheel and axle assembly in the desired position. The lock plate 84 is pivotally mounted at 86 to a bracket extending from frame member 44 and is spring biased by a tension spring 88 (FIG. 2) extending between the locking pin 82 and the frame member 44. The lock plate 84 is rotated to permit rotary movement of the latch plate 72 by means of the control rod 90 on the handle assembly which is operated by the control lever 92 from the operator's station.

The aerating mechanism 28 as indicated comprises two pairs of tine arm assemblies, each assembly being essentially identical and hence a single description will suffice for both. Each pair of tine arm assemblies is centered around and supported by one of the arms 48 of the frame member 46 and includes a bearing assembly 94 supported by the gusset plates 50 and through which extends a crankshaft 96 which carries on its opposite end oppositely directed cranks 98. Tine arms 100 are pivotally connected at their upper ends through suitable bearing assemblies to the cranks 98. At their lower ends, the tine arms 100 each carry brackets 102 from which extend a plurality of hollow coring tines 30 which gradually taper to prevent plugging of the turf cores therewithin.

The crankshafts 96 each carry a chain sprocket 104 at their inner ends by means of which the crankshafts are driven in synchronous rotation. A jackshaft 106 journalled at each end on the opposed frame arms 48 carries chain sprockets 108 aligned with the crankshaft sprockets 104. Drive chains 110 connecting the sprockets 104 and 108 maintain the crankshafts in synchronism.

The jackshaft 106 is driven in rotation through a belt sheave 112 attached thereto by a V-belt 114 passing thereover which also passes around a drive sheave 116 rotatably mounted on a jackshaft 118 extending between the upright frame members 42. The sheave 11.6 is bolted to a larger companion sheave 120 around which passes the main drive belt 122 from the engine drive pulley 124. The manner in which the tine drive mechanism drive belt 114 and the main drive belt 122 are selectively tensioned to provide their respective driving functions is discussed below.

Figure 11:
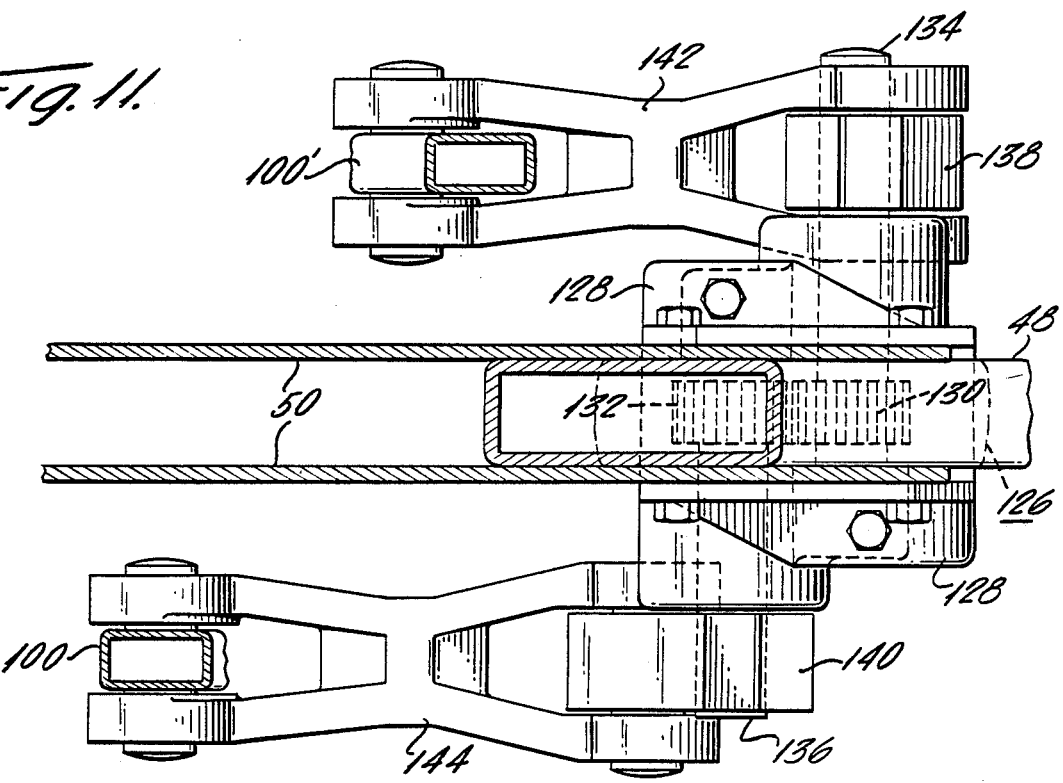
FIG. 11 is a plan view partly in section of the mechanism shown in FIG. 10.
Figure 10:
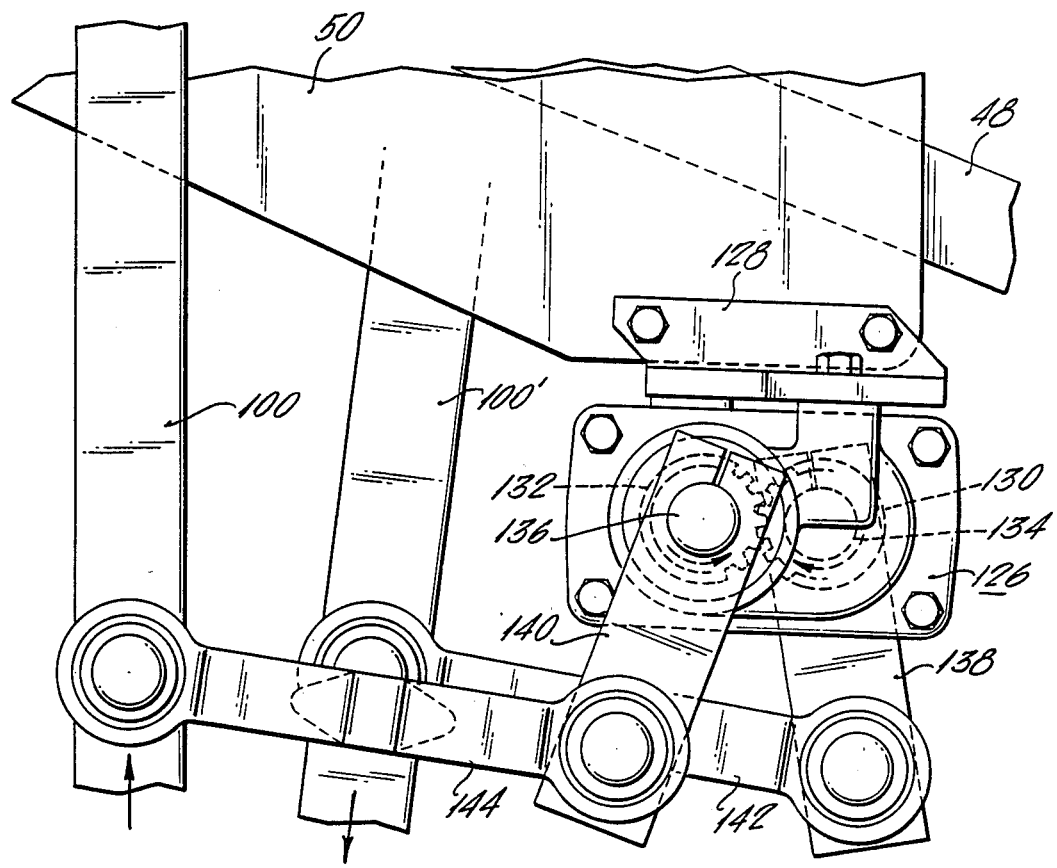
FIG. 10 is an enlarged view taken along line 10—10 of FIG. 2 showing details of the tine arm return mechanism.

An important aspect of the present invention is the tine arm return mechanism for positioning the lower ends of the tine arms preparatory to entry of the tines into the ground. The return mechanism in the preferred embodiment comprises a gear box 126 as best shown in FIGS. 10 and 11 which is secured by brackets 128 to the forward lower end of gusset plates 50. As shown in FIG. 10, the gear box contains a pair of enmeshed spur gears 130 and 132 of equal diameter which are respectively mounted on shafts 134 and 136. Shaft 134 extends from one side of the gear box 126 while shaft 136 extends from the opposite side of the gear box. The extending ends of the shafts 134 and 136 are respectively connected with the upper ends of the downwardly extending cranks 138 and 140. Bifurcated links 142 and 144 pivotally connect the lower ends of the cranks 138 and 140 respectively to the lower ends of the tine arms 100 and 100' as designated in FIGS. 10 and 11.

As shown by the arrows in FIG. 10 as tine arm 100 moves downwardly into engagement with the ground, it is moved rearwardly with respect to the apparatus, thereby, through the link 142 and crank 13B, rotating the shaft 134 and gear 130 in a clockwise direction. This produces an equal and opposite movement of the gear 132, shaft 136, crank 140, and link 144, thereby moving the lower end of the tine arm 100, which is free of the ground, forwardly with respect to the machine at a rate and distance equal to the movement of the tine arm 100' rearwardly.

An important feature of the tine arm return mechanism as shown in FIGS. 1–3 (and omitted for clarity of other structure in FIGS. 10 and 11) is the provision of stop members to control the forward movement of the cranks 138 and 140. Stop supports 136 and 148 extend downwardly from a transverse frame member 150 and carry resilient stop pads 150 and 152 thereon to respectively engage the cranks 138 and 140 at the forward end of their return stroke. The stops are provided to prevent the inertial force of the forwardly moving tine arm, link and shaft from unduly continuing the forward movement since there is minimal braking resistance from the rearward tine arm which has nearly been withdrawn from the turf. Without the stops, the free tine arm could continue forwardly under inertial forces so as to risk pushing the withdrawing tine arm rearwardly with possible damage to the turf. The stops halt the motion of both tine arms and accurately position the forwardly moving tine arm for entry into the ground.

Figure 12:
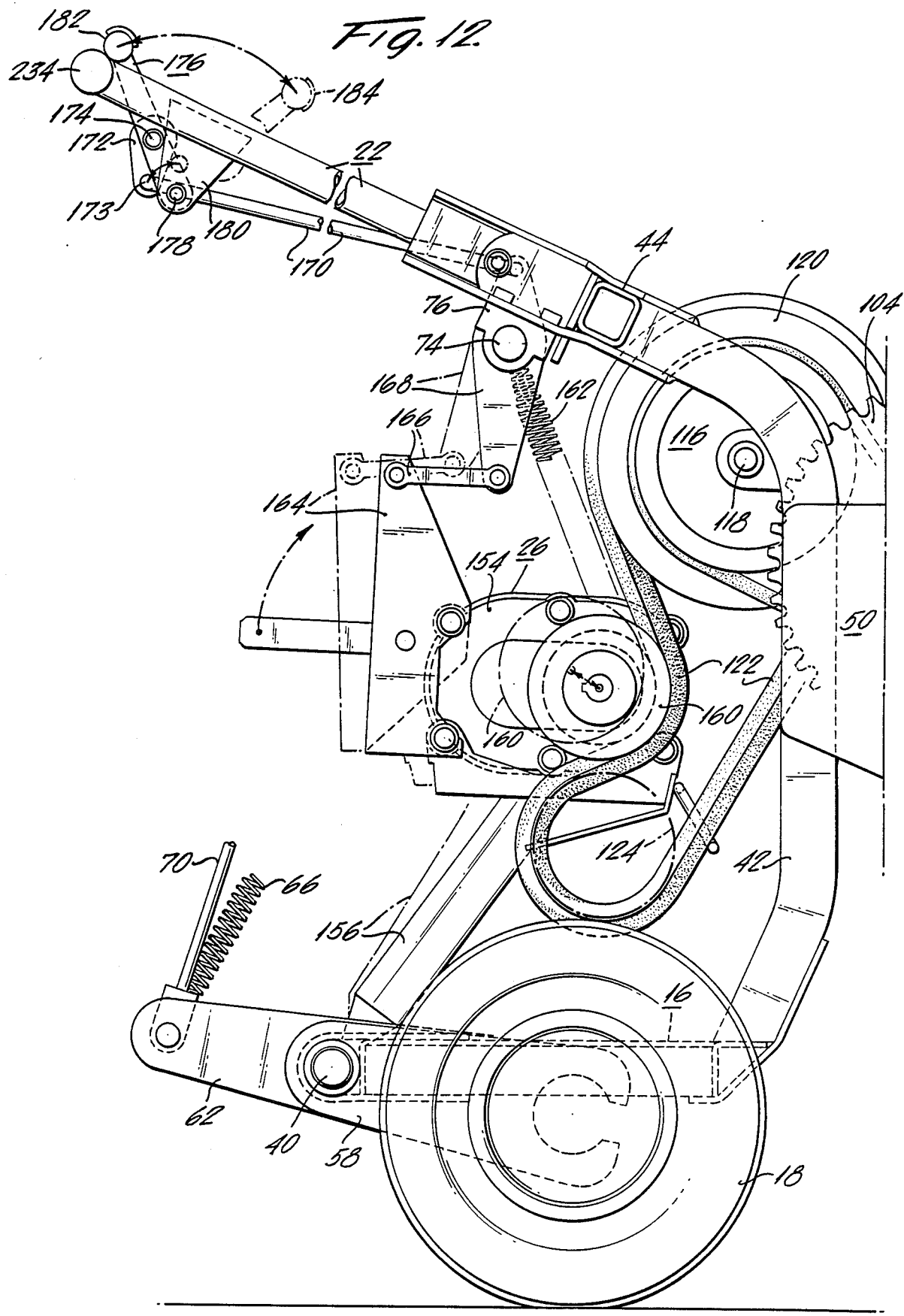
FIG. 12 is an enlarged fragmentary side elevational view taken along line 12—12 of FIG. 2.

The transmission 26 for controlling the drive from the motor pulley 124 through the drive belt 122 to the sheave 120 includes a mechanism for selectively tightening and releasing the tension of the drive belt, thus serving the function of a clutch. This arrangement includes a reduction gear box 154 which is mounted on a support post 156 as best seen in FIG. 12. The lower end of the post 156 is pivotally mounted on the transverse frame shaft 40, thus permitting arcuate movement of the gear box 154 as shown by the arrows in FIG. 12.

Extending from one side of the gear box 154 is a gear shaft 158 on which is mounted a belt sheave 160. It will be noted from FIG. 12 that the main drive belt 122 is a double V-belt, having a V configuration in each direction since power is transferred from both sides of the belt in the present apparatus.

When the gear box 154 is moved forwardly to tension the belt 122, power is transmitted simultaneously into the gear box 154 through the shaft 158 as well as to the tine drive mechanism sheave 120. Retraction of the gear box away from the belt 122 will serve to discontinue power transmission both to the tine arm drive sheave as well as to the gear box 154 which, as presently described, provides driving power to the main drive wheels 18.

A tension spring 162 extending between the frame shaft 74 and the gear box 154 serves to bias the gear box about its pivot attachment to shaft 40 in a direction away from the belt 122. The gear box 154 and the sheave 160 carried thereby are selectively movable toward the belt 122 by a control linkage including an upstanding arm 164 bolted to the gear box 154, a link 166 joining the upper end of arm 164 to the lower end of a lever 168 pivoted on the shaft 74, and a control rod 170 pivotally connected to the upper end of the lever 168. At its opposite end, the control rod 170 is pivotally connected at 173 to tang 172 on the crossbar 174 connected to operating lever 176 at the operator's station. Lever 176 is pivoted at 178 on handle bracket 180 and is rotatable from a belt engaged position 182 adjacent the handlebar to a belt disengaged or idling position 184 remote from the handlebar. The pivot 173 of the rod 170 to the tang 172 is slightly above the center line joining the pivot 178 and the opposite end pivot of the rod 170 so that some control linkage force is required by the operator to hold the transmission into engagement. A very minimal force is required, however, since the pivot center 173 is close to being over center. Should the operator release the control lever 176, the force of spring 162 would pull the gear box away from the belt and release the drive.

The gear box 154, which includes reduction gears providing a reduction of about 22/1, includes a driven shaft 186 having a chain sprocket 188 slideably mounted thereon. The sprocket 188 is selectively moved axially along the shaft 186 by a shifting arm 190 having a bifurcated end disposed in a slot of an extending hub portion 192 of the sprocket 188. A drive pin 194 on the shaft 186 selectively engages radial slots 196 of the sprocket in response to axial movement of the sprocket as controlled by the arm 190.

Figure 4:
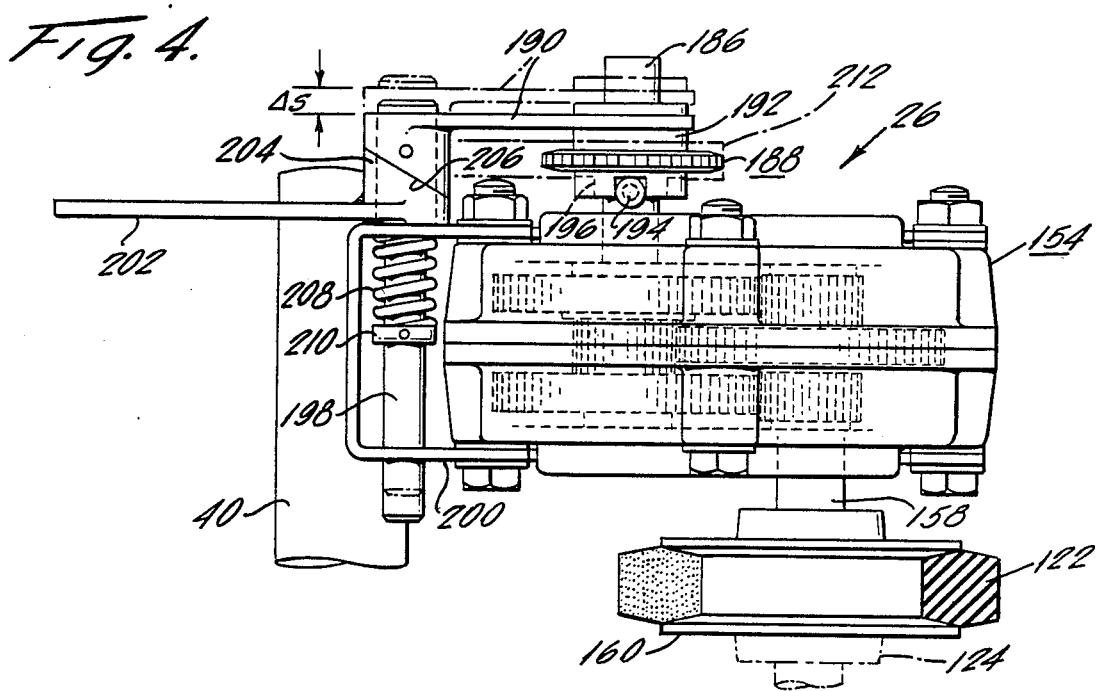
FIG. 4 is an enlarged view taken along line 4—4 of FIG. 1 showing details of the drive wheel transmission.

The arm 190 includes a hub portion carried on a shaft 198 which is slidingly supported by bracket 200 at the rear of the gear box 154. A clutch lever 202 is carried the shaft 198 and includes a hub portion having an angled face 204, the hub portion of arm 190 having a similarly angled face 206 cooperatively engaging the angled face 204. Arm 190 is selectively moved outwardly to the dotted line position of FIG. 4 by the upward movement of the clutch lever 202 and the interaction of the angled faces 204 and 206. A spring 208 in compression on the shaft 198 acting between the bracket 200 and a spring stop 210 on the shaft urges the shaft and arm 190 axially into the engaged solid line position shown in FIG. 4 wherein the sprocket 188 is driven by the shaft 186 by engagement of pine 194 with one of slots 196. This described clutch arrangement is not ordinarily used when the engine is running but is provided to permit disengagement of the transmission for moving the machine manually, such as in the shop during maintenance. The internal friction of the gear box makes it difficult to manually move the machine without disengagement of the gear box.

A drive chain 212 as best seen in FIG. 5 connects the sprocket 188 with an intermediate sprocket 214 rotatably mounted on the frame shaft 40. A companion sprocket 216 connected to the sprocket 214 and also rotatable on the shaft 40 is connected by a chain 218 to the differential sprocket 56 of the axle 52. Power from the main drive belt 122 is thus transmitted through the reduction gear box 154 and by means of chains 212 and 218 to the drive axle. Since the axle and wheel assemblies pivot about the shaft 40, the drive arrangement is not affected by the shifting of the wheels to the transport position of FIG. 3.

The tine arm drive belt 114 is held in driving tension by an idler pulley 220 carried on the outer end of arm 222 of a bellcrank assembly mounted on the shaft 118. The other arm 224 of the bellcrank is connected by link 226 to arm 228 of the latching plate 72. When the latch plate is rotated as shown in FIG. 3 upon the shifting of the wheels to the transport position, the described linkage actuates the bellcrank carrying the idler pulley 22 to lift the pulley away from the belt, allowing the belt to go slack and discontinue the drive to the tine arm assembly. Upon raising of the wheels and the rotation of the latch plate 72 to the operating position of FIG. 1, the pulley 220 is automatically lowered and the tine arm drive belt 114 is again tensioned. Since the main drive belt 122 is not in tension when the lifting mechanism is operated to change the wheel position, the engagement of pulley 20 with the belt 114 does not initiate a driving of the tine arms.

The handle assembly 22 includes a pair of parallel tubular handle elements 230 which at their outer ends are connected by a handlebar 232 having hand grips 234 on its outer ends. As shown in FIGS. 7-9, the inner ends of the handle elements 230 are connected to the handle support assembly 76 in a manner which minimizes transmission of vibrations to the operator. The inner ends of the handle elements 230 are strengthened by the addition of cylindrical inserts 236. On the exterior of the end of each handle elements 230, a resilient sleeve 238, for example, of soft rubber, having a central bore therein to accommodate the handle element is positioned along the handle element near the supported end thereof. Positioned adjacent each end of sleeve 238 are annular stop elements 240 which are preferably made of a hard plastic material such as ultra high molecular weight polyethylene. These stop elements have a radial dimension slightly less than that of the resilient sleeve 238.

As shown in the sectional view of FIG. 9, the handle support members 76 are formed to provide a substantially rectangular box-like receptacle for the handle element end bearing the resilient sleeve 238 and the stop members 240. Specifically, the support member 76 includes a bottom wall 242, sidewall 244 and top wall 246 forming a cavity within which the handle end is inserted. A U-shaped member 248 having a bore 250 in one end thereof provides the closing wall for the cavity. A bolt 252 extends through wall 44, the resilient sleeve 238, the handle element 230 and reinforcing member 236, through the U-shaped member 248 and through an angle bracket 254 secured by bolt 256 to the transverse frame element 44. The tightening of the bolt 252 moves the U-shaped element 248 inwardly into the cavity, thus tightly compressing the resilient sleeve 238 against the cavity walls. The degree of resiliency of the handle mount can be varied by tightening or loosening the bolt to decrease or increase the resiliency of the sleeve. The stop elements 240, being of a smaller diameter, do not in the rest position of the handles engage the cavity walls but will do so when the handle is moved through a significant vertical displacement with respect to the apparatus frame. Since the bolts 252 are disposed horizontally. the handle elements 230 are free to pivot about these bolts in the vertical plane and allow the absorption of most of the vertical vibration forces by the resilient sleeve 238. Since the tine arms are reciprocating vertically, the bulk of the vibrations are in the vertical plane and are thus absorbed by the described handle mounting arrangement.

The operation of the apparatus is quite simple since there are essentially only two operating controls, the locking control for raising or lowering the wheels, and the clutch control for controlling power to the drive wheels. As indicated, the clutch lever 202 is not employed in the normal operation of the device but is provided to permit disengagement of the reduction gears from the axle drive to permit manual movement of the machine when the engine is not running.

For operation, the engine is started with the operating lever 176 in the disengaged position 184 as shown in FIG. 12. Unless held rearwardly by the operator, the lever will revert to the clutch disengaged position automatically by action of the spring 162, thereby providing a safety feature. Although the engine may be started with the wheels in either the raised or lowered position, ordinarily the wheels would be in the lowered transport position.

With the wheels in the lowered position, the machine may be driven to the turf area to be aerated by a rearward application of the operating lever 176 to a position adjacent the handlebar 232, thereby moving the gear box 154 forwardly to engage the sheave 160 thereof with the drive belt 122. The machine will then move forwardly and can be steered by appropriate movement of the handle 22. Turns may readily be made in view of the differential drive to the wheels 18 and the pivotal mounting of the front wheel 20.

Upon arrival at the work area, the operating lever is released to discontinue the drive to the wheels and the wheels are raised by releasing the lever 92 to unlock the latch plate 72, and pushing down on the handlebars against the force of springs 66 until the wheels are in the correct position, at which point locking pin 82 engages the notch 80 of the latch plate to lock the wheels in the operating position. This shifting of the wheels also automatically tensions the tine arm drive belt 114 since the idler 220 is connected by a bellcrank mechanism to the latch plate 72. Although the tine arm drivebelt 114 is automatically tensioned when the wheels are raised, the tine arms are not driven in reciprocation until the main drive belt 122 is tensioned by movement of the operating lever 176.

To initiate the turf aeration, the operating lever 176 is simply pulled rearwardly to its stop position against the handlebar, and the machine will proceed forwardly at a rate determined by the engine speed with the coring tines 30 being reciprocated into and out of engagement with the ground to form a repeating pattern of holes in the turf.

Since the tine arm return mechanism advances the tine arm free of the ground a distance equal to the rearward movement of the tine arm in the ground, the plurality of independent return mechanisms compensates for turning movements of the machine. For example, if the machine is turning to the left, t he tine arm on the left side of the machine will be traveling a shorter distance than the tine arm on the right side and the return mechanism on the left side will accordingly advance the free tine arm a shorter distance forward than the return mechanism on the right side.

Although the embodiment described shows two pairs of tine arm assemblies in side-by-side relation, it will be obvious that additional pairs could be employed as desired to increase the width of the aerating pattern. The described automatic compensation of the tine return system will function in the manner described to compensate for deviations of the apparatus path from a straight line.

It will be seen from the position of the tine arm cranks, for example in FIG. 2, that in the preferred embodiment, the outermost tine arms will engage the ground together and the two inner tine arms will also engage the ground together. This arrangement is preferred since it generates substantially vertical vibratory motions in the machine which can be most readily damped by the resilient handle attachment.

If desired, the turf engaging sequence can be changed by adjustment of the chain drive to the tine arms to stagger the ground engagement of the tines so that each set of tines would engage the ground at a different time. The disadvantage of such arrangement is the introduction of a rocking or rolling motion to the machine which would make the machine unpleasant and tiring to operate.

The path that one of the tines would take with respect to the turf is shown at the bottom of FIG. 1 and has the appearance of a series of sawteeth. It can be seen that the left hand set of tines has just cleared the ground level on its upward stroke, having through the gear box effected a forward movement of the right hand tine arm to a position against the stop 152. As the tines of the right hand tine arm move downwardly into the turf, the forward motion of the machine will move the left hand tine arm forwardly as it is raised through the interconnection of the links, cranks and gear box. The forward travel of the tines accordingly takes place almost exclusively during the upward movement of the tines when clear of the ground. When the tine arms move downwardly, engagement with the ground prevents any forward movement of the tines.

Although spur gears are shown in the tine arm return mechanism gear box, since only a portion of the gear teeth are utilized, toothed quadrants or similar interacting arrangements could also be used to produce the desired arcuate movement.

Manifestly, changes in details of construction can be effected by those skilled in the art without departing from the invention.

We claim:

1. Turf aerating apparatus comprising a frame, means supporting said frame for rolling movement across a turf area, means for driving said supporting means to move said frame across the turf, an aerator mechanism mounted on said frame comprising at least one pair of substantially vertical tine arms, each said tine arm having at least one downwardly directed turf coring tine disposed on the lower end thereof, said aerator mechanism including tine arm actuating means connected to the upper end of each said tine arm for imparting an alternating reciprocatory motion to said tine arms to drive said tines into the turf, said aerator mechanism further including a tine arm return mechanism for each pair of tine arms for alternately returning the lower end of said tine arms to a forward position following each ground penetrating stroke, said tine arm return mechanism including a gear mechanism comprising a pair of gear elements cooperatively engaged for arcuate oscillatory movement in opposite directions, and a linkage pivotally connecting the lower end of each said tine arm with one of said gear elements whereby the downward engagement of the tine of one of said tine arms with the turf and the forward movement of the frame across the turf produces a relative rearward movement of the engaged tine arm with respect to the frame, thereby through said gear mechanism producing an equal and opposite forward movement of the lower end of the tine arm free of the turf to advance said latter tine arm into position for engaging the turf.

2. The invention as claimed in claim 1, wherein said gear elements comprise a pair of equally sized spur gears.

3. The invention as claimed in claim 2, said gear mechanism comprising a gear box enclosing said spur gears, a first shaft carrying a first of said gears extending from one side of said box and having a first crank thereon, a second shaft for the second of said gears extending from the opposite side of said box and having a second crank thereon, and links connecting the lower end of each said tine arm with one of said cranks.

4. The invention as claimed in claim 1, including stop means for limiting the travel of said cranks.

5. The invention as claimed in claim 4, wherein said stop means comprises resilient stop elements on said frame limiting the forward travel of said cranks.

6. Turf aerating apparatus comprising a frame, means supporting said frame for rolling movement across a turf area, means for driving said supporting means to move said frame across the turf, two aerator mechanisms mounted on said frame, each said aerator mechanism comprising at least one pair of substantially vertical tine arms, each said tine arm having at least one downwardly directed turf coring tine disposed on the lower end thereof, each said aerator mechanism including tine arm actuating means connected to the upper end of each said tine arm for imparting an alternating reciprocatory motion to said tine arm to drive said tines into the turf, each said aerator mechanism further including a tine arm return mechanism for alternately returning the lower end of said tine arms to a forward position following each ground penetrating stroke, means for maintaining each of said tine arms in a substantially vertical plane aligned with the direction of movement of said frame throughout the cycle of tine arm movement, each said tine arm return mechanism including motion transmission means connected to the lower portions of each of said tine arms for producing a forward movement with respect to the frame of the lower end of the one of said tine arms free of the turf commensurate with the rearward movement of the lower end of the other of said tine arms with respect to said frame effected by engagement of the tine arm with the turf during forward movement of said frame across the turf, the motive force of said motion transmission means being provided solely by the engagement of the coring tines with the turf.

7. The invention as claimed in claim 6 wherein said aerator mechanisms are mounted in side-by-side relation.

8. The invention as claimed in claim 6 wherein said motion transmission means includes a gear mechanism and links connecting the lower end of said tine arms thereto.

9. Turf aerating apparatus comprising a frame, means supporting said frame for rolling movement across a turf area, said means comprising a pair of drive wheels mounted on a common axle disposed beneath the rear end of said frame, said means further comprising a castering wheel disposed beneath the front end of said frame, means for driving said drive wheels to move said frame across the turf, an operating handle fixedly attached to said frame and extending rearwardly therefrom, an aerator mechanism mounted on said frame comprising at least one pair of substantially vertical tine arms, each said tine arm having at least one downwardly directed turf coring tine disposed on the lower end thereof, said aerator mechanism including tine arm actuating means connected to the upper end of each said tine arm for imparting alternating reciprocatory motion to said tine arms to drive said tines into the turf, said coring tines extending below said frame and being disposed behind said castoring wheel and ahead of said drive wheels, and means for selectively adjusting the vertical position of said axle with respect to said frame to establish either a lowered aerating position of said aerator mechanism or a raised transport position thereof, said latter means comprising axle support arms pivotally mounted on said frame connecting said axle to said frame, spring means connected to said support arms for biasing said axle in a downward direction with respect to said frame, and means for selectively locking said axle in either a lowered transport position or a raised aerating position, said spring means having sufficient force to permit the manual adjustment of said axle into either of said positions by means of said handle.

10. The inventions claimed in claim 9, wherein the force of said spring means is substantially equal to the weight of said drive wheels.

11. The invention as claimed in claim 10, wherein the force of said spring means is such as to bring said axle into a position intermediate said raised or lowered positions when said locking means is disengaged.

12. The invention as claimed in claim 9, wherein said spring means comprises a tension spring operatively connecting said support arms with said frame.

* * * * *